(12) United States Patent
Sorrells

(10) Patent No.: US 6,996,464 B2
(45) Date of Patent: Feb. 7, 2006

(54) AUTOMATED SPEED LIMITING BASED ON MACHINE LOCATED

(75) Inventor: Giles K. Sorrells, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/328,741

(22) Filed: Dec. 23, 2002

(65) Prior Publication Data

US 2004/0122576 A1 Jun. 24, 2004

(51) Int. Cl.
G06G 7/76 (2006.01)

(52) U.S. Cl. .......................... 701/50; 701/207; 701/208; 172/9

(58) Field of Classification Search .................... 701/1, 701/48, 50, 208, 212, 257; 346/438, 439; 172/4, 5, 9
See application file for complete search history.

(56) References Cited

U.S. PATENT DOCUMENTS

| | | | |
|---|---|---|---|
| 4,651,290 A | 3/1987 | Masaki et al. | |
| 4,690,553 A | 9/1987 | Fukamizu et al. | |
| 4,809,197 A | 2/1989 | Tashiro et al. | |
| 4,837,727 A | 6/1989 | Tashiro et al. | |
| 5,146,219 A * | 9/1992 | Zechnall | 340/995.24 |
| 5,400,018 A | 3/1995 | Scholl et al. | |
| 5,513,108 A | 4/1996 | Kishimoto et al. | |
| 5,857,159 A | 1/1999 | Dickrell et al. | |
| 5,962,833 A | 10/1999 | Hayashi | |
| 6,095,277 A | 8/2000 | Bohner et al. | |
| 6,185,496 B1 | 2/2001 | Matsuno | |
| 6,199,001 B1 * | 3/2001 | Ohta et al. | 701/51 |
| 6,240,356 B1 * | 5/2001 | Lapke | 701/93 |
| 6,343,253 B1 | 1/2002 | Matsuura et al. | |
| 6,363,315 B1 * | 3/2002 | Love et al. | 701/104 |
| 2001/0027371 A1 | 10/2001 | Gielda | |

* cited by examiner

Primary Examiner—Gertrude A. Jeanglaude
(74) Attorney, Agent, or Firm—Thomas L Derry

(57) ABSTRACT

The present invention provides a method and apparatus for automatically limiting the ground speed of a work machine. The work machine is adapted to move about the ground of a work site. An electronic site map having at least one speed restriction is maintained at a site office. The work machine monitors its position using an onboard GPS system and compares its actual speed and position to the site map. If the work machine exceeds the speed restriction, the work machine receives a signal and reduces speed.

17 Claims, 3 Drawing Sheets

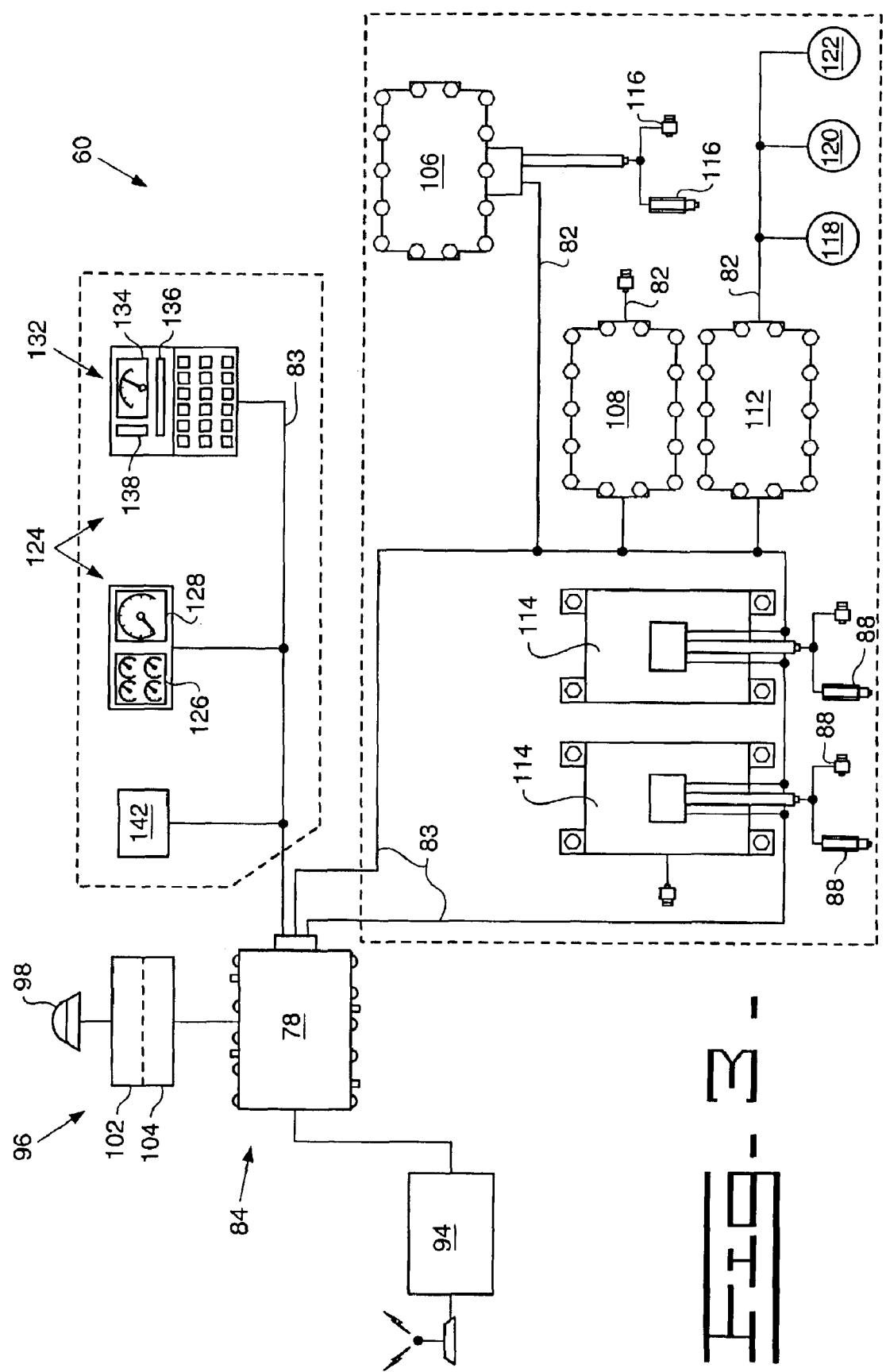

US 6,996,464 B2

AUTOMATED SPEED LIMITING BASED ON MACHINE LOCATED

TECHNICAL FIELD

This invention relates generally to a work machine and more specifically to a method and apparatus for applying a speed restriction to the machine, based on the location of the machine on a work site.

BACKGROUND

Work sites such as large mining operations use numerous work machines to remove material from the earth. The material is then moved to a processing area for extracting valuable commodities, such as coal and ore from the material. Work machines include off-high trucks, large shovels, motor graders, and the like.

As material is depleted from an area of the mine, the roads are changed to permit access to more material. Because the changes in the roads are frequent, it is very difficult to keep machine operators informed of road conditions and speed limits. Although posting signs related to road conditions is possible, it becomes time consuming and expensive when conditions are continuously changing. Additionally, road signs often get destroyed or otherwise rendered useless.

Another problem at mine sites relates to operators who don't follow posted speed limits. For the safety of all working at these sites it is desired to provide an inexpensive method of informing operators of road conditions and restrictions for the specific road that they are traveling.

SUMMARY OF THE INVENTION

In an aspect of the invention a method of slowing a work machine includes maintaining an electronic site map, monitoring the position of the machine in relation to the site map, comparing the speed of the machine to the restricted speed, and sending a signal causing the machine to reduce speed.

In another aspect of the invention, a work machine is configured to automatically limit ground speed based on location relative to a site map. The work machine, includes a site map having a speed restriction. An onboard GPS system is configured to track the position of said work machine, and a main control module is adapted to send a signal related to exceeding the speed restriction.

BRIEF DESCRIPTION OF THE DRAWINGS

FIG. 3 is a diagrammatic representation of a control system as would be used on the work machine.

DETAILED DESCRIPTION

Figure 1:
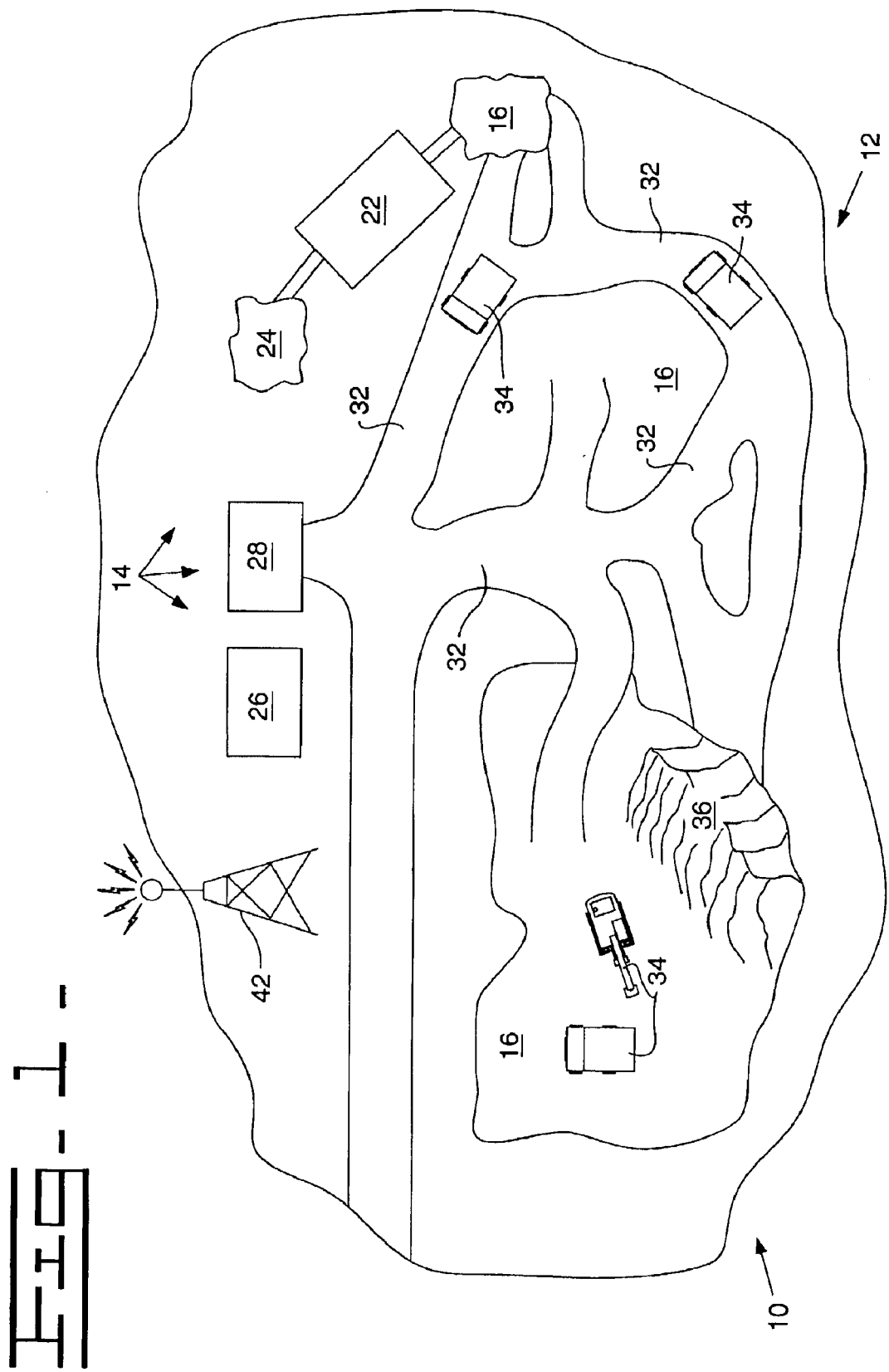
FIG. 1 is a diagrammatic representation of a typical mine site having a plurality having a system of roads for work machines to travel.

Referring to FIG. 1, a site map 10 of a typical mine site 12 is illustrated. A mine site is used for example only; use of the present invention is not intended to limited to any particular type of work site. The mine site 12 having a plurality of facilities 14 including a quarry 16, a dumping area 18, a processing plant 22, an overburden pile 24, a site office 26 and a service shop 28. The facilities 14 are interconnected by a system of roads 32. The system of roads 32 are used by a plurality of work machines 34 to move earth from the quarry 16 to the dumping area 18 prior to processing. After processing, unwanted overburden is moved from the processing plant 22 to a spoil pit 36. As material is depleted from the quarry 16, new roads 32 are constructed to allow the quarry 16 to be expanded. A surveying system using Global Positioning Satellites (GPS) is used at the mine site 12 for monitoring changes to the mine site 12. A GPS correction station 42 is provided to increase the accuracy of the surveying system.

Mine managers working in the site office 26 direct movements of the work machines 34 about the mine site 12 while maintaining the site map 10. The site map 10 is used to record changes in the roads 32, road conditions and restrictions. The site map 10 is stored as an electronic file on a computer (not shown) in the site office 26. Road conditions and restrictions include, but are not limited to speed limits, surface condition and position of the road in relation to the site map 10. As the roads 32 are modified, safety factors may require the mine manager to place speed restrictions on portions of the road 32. Using the computer having the site map 10, the mine manager can select a portion of road 32 and electronically apply a speed restriction to that portion of road 32.

Figure 2:
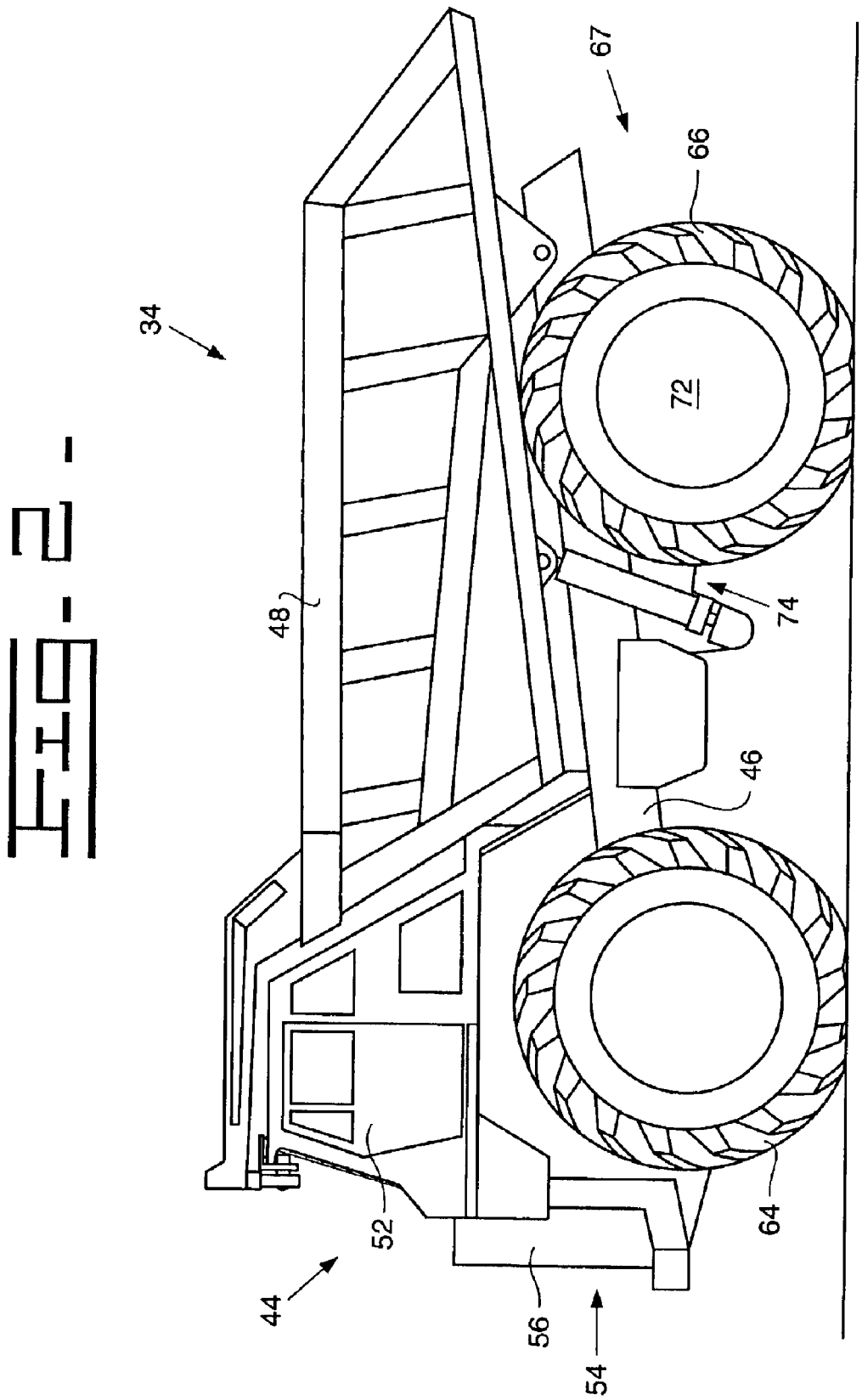
FIG. 2 is an illustration of an off-highway truck used as a work machine at the mine site.

Referring now to FIG. 2, one example of a work machine 34 is an off-highway truck 44. The off-highway truck 44 is used to move material from the quarry 16 to the processing plant 22. The truck 44 comprises a frame 46, and a dump body 48 pivotally mounted to the frame 46. An operator cab 52 is mounted on the front 54 of the frame 46 above an engine enclosure 56. The operator cab 52 includes an operator control system 60 having a plurality of inputs and displays 62 (shown in FIG. 3). The truck 44 is supported on the ground by a pair of front tires 64 (one shown), and a pair of driven rear tires 66 (one shown) at the rear 67 of the truck 44. As well known in the art, one or more engines (not shown) are housed within the engine enclosure 56. The engine is used to provide power to a final drive assembly 72, via a mechanical or electric drive train 74.

Referring to FIG. 3, the control system 60 includes a main control module 78. The main control module 78 is electrically connected to a plurality of machine systems 82 via a data link 83. The main control module 78 includes a processor 84 that compares electronic data from a plurality of machine sensors 88 with predetermined limits for the machine systems 82. The main control module 78 is also adapted to record and events when sensor data 92 is outside the predetermined limits. Events can be categorized as a machine event or a system event. Machine events occur when the machine is being operated outside of normal limits. System events occur when self-diagnostic capabilities of the main module 78 determine that the work machine 34 has a faulty electronic component.

The main control module 78 utilizes a radio 94 system to communicate with the site office 26 and other work machines 34. An onboard GPS system 96 comprising an antenna 98, receiver 102 and processor 104 interface the main control module 78. The onboard GPS system 96 tracks the position of the work machine 34 in relation to the site map 10. The position of the work machine 34 is relayed to the site office 26 via the main control module 78 and the radio system 94.

The plurality of machine systems 82 include, but are not limited to, an engine control module 106, a transmission control 108, a brake control 112 and one or more interface modules 114. The engine control module 106 is electronically coupled to a plurality of engine sensors 116 for monitoring various engine operating parameters. Engine operating parameters include, oil pressure, coolant temperature, engine RPM and fuel injector position. The engine control module 106 additionally sends signals to the engine 68 related to desired engine speed. The transmission control 108 monitors and controls a plurality of transmission operating parameters. Transmission operating parameters include gear lever position, gear selection, transmission oil temperature and torque converter status. The brake control 112 monitors and controls a parking brake 116, a service brake 118 and an automatic retarder system 122. The parking brake 116 is automatically applied when the machine 34 is shut down and out of service. The service brake 118 is normally actuated by the operator to slow the machine 34. The automatic retarder system 122 actuates the service brake 118, or down shifts the transmission to slow the machine. The preset speed is set from the operator's cab 52.

The main control module 78 is also electrically connected to a plurality of monitoring devices 124 positioned in the operators cab 52. The plurality of monitoring devices 124 includes gauges 126, speedometer/tachometer 128 and a message center 132. The message center 132 is positioned in easy view of the operator and is adapted to automatically relay information between the operator, main control module 78 and the site office 10. The message center 132 provides a variety of machine system information through a universal gage 134, and a digital display 136. An alert indicator 138 informs the operator of abnormal machine operating parameters. Additionally, an override switch 142 is provided in the operator's cab 58. The override switch 142 is electrically connected to main control module 78 and is configured to disable certain automatic functions of the main control module 78.

INDUSTRIAL APPLICABILITY

Using conventional programming methods, the main control module 78 is adapted to act as an interface between the work machine 34, control system 60 and site office 26. The site office 26 maintains the site map 10, altering and placing road restrictions as needed. The main control module 78 monitors the site map 10 for the relevant road restrictions. As the work machine 34 travels along the road 32, the main control module 78 compares road restrictions with actual position and speed of the work machine 34. If the actual speed exceeds the speed restriction, the main control module 78 records an event and sends a signal to the alert indicator 138. The main control module 78 can be configured to apply different categories of events and warnings depending upon the amount the speed restriction is being exceeded.

An alternative to having the main control module 78 monitor the map, includes having the main control module 78 send data related machine 34 position and speed to the site office 12. The computer at the site office 12 can compare the actual speed to the restricted speed. If the actual speed exceeds the speed restriction, the computer sends a signal to the main control module 78 causing an event and activating the alert indicator 138.

Another alternative includes automatically slowing the machine 34 if the operator does not manually slow the machine 34. The main control module 78 is programmed to slow the machine by one of the following methods; (i) reducing engine RPM, (ii) downshifting the transmission, or (iii) applying the brakes. The method of automatic slowdown should be determined considering the following; RPM the engine 68 is running at, current throttle setting and how much the machine is exceeding the restricted speed. For example, if the engine 68 is already at or near the maximum RPM limit and the throttle setting is high, the throttle setting should reduced. If RPM is near maximum and throttle setting is low, it can be assumed the work machine 34 is coasting down a hill, service brakes 118 should be used to slow the machine 34. The main control module 78 monitors the override switch 142 when automatically reducing machine speed. Should the operator desire to maintain a speed above the restricted speed, the override switch 142 can be used to disable the automatic speed reduction.

What is claimed is:

1. A method of slowing a work machine comprising the steps of:

maintaining an electronic site map, wherein said site map includes at least one speed restriction;

monitoring the position of said work machine in relation to said site map;

comparing the speed of the speed machine to the restricted speed; and sending a signal causing a control module on said work machine to automatically reduce speed responsive to said comparison.

2. The method of slowing the machine of claim 1, wherein said step of sending said signal includes using a radio.

3. The method of slowing the work machine of claim 1, wherein the step of monitoring the position of said work machine includes using an onboard GPS system.

4. The method of slowing the work machine of claim 1, wherein said step of comparing the work machine speed to the speed restriction includes using a computer in a site office.

5. The method of slowing the work machine of claim 1, including a step of activating an alert indicator.

6. The method of slowing the work machine of claim 1, including a step of recording an event.

7. The method of slowing the work machine of claim 1, including a step of downshifting a transmission.

8. The method of slowing the work machine of claim 1, including a step of sensing a throttle setting and an engine RPM and activating a brake when RPM is near maximum and throttle setting is low.

9. The method of slowing the work machine of claim 1, including a step of sensing a throttle setting and an engine RPM and reducing a throttle setting when near maximum RPM and the throttle setting is high.

10. A work machine being configured to automatically limit ground speed based on the location of said work machines relative to a site map, said work machine comprising:

a site map related to a path of travel of said machine, said site map including at least one speed restriction;

an onboard GPS system configured to monitor the position of said work machine relative to said site map; and a main control module adapted to send a signal related to said work machine exceeding said speed restriction to a control module on said work machine to automatically reduce speed.

11. The work machine of claim 10, wherein said site map is stored electronically on a computer in a site office.

12. The work machine of claim 11, wherein information related to said site map is transmitted from said site office to said work machine via a computer.

13. The work machine of claim 10, wherein said reduction of speed is achieved by reducing a fuel setting.

14. The work machine of claim 10, wherein said reduction of speed is achieved by downshifting a transmission.

15. The work machine of claim 10, wherein said reduction of speed is achieved by applying a brake.

16. The work machine of claim 10, wherein said work machine includes an override switch adapted to prevent said main control module from automatically reducing said work machine speed.

17. The work machine of claim 10, wherein said main control module records an event if said work machine speed exceeds said speed restriction.

* * * * *

UNITED STATES PATENT AND TRADEMARK OFFICE
CERTIFICATE OF CORRECTION

PATENT NO. : 6,996,464 B2 Page 1 of 1
APPLICATION NO. : 10/328741
DATED : February 7, 2006
INVENTOR(S) : Giles K. Sorrells It is certified that error appears in the above-identified patent and that said Letters Patent is hereby corrected as shown below:

Title page,
Item [54], Title, delete "LOCATED" and add -- LOCATION --.

Column 4,
Line 8, delete "speed machine" and insert -- work machine --.
Line 53, delete "fuel" and insert -- throttle --.

Signed and Sealed this

Eleventh Day of July, 2006

JON W. DUDAS
*Director of the United States Patent and Trademark Office*